Jan. 9, 1968  A. G. CARTER  3,362,748
LOCK-RELEASE SYSTEM FOR VEHICLE SAFETY BELTS
Filed March 28, 1966  2 Sheets-Sheet 1

INVENTOR.
ANDREW G. CARTER

BY

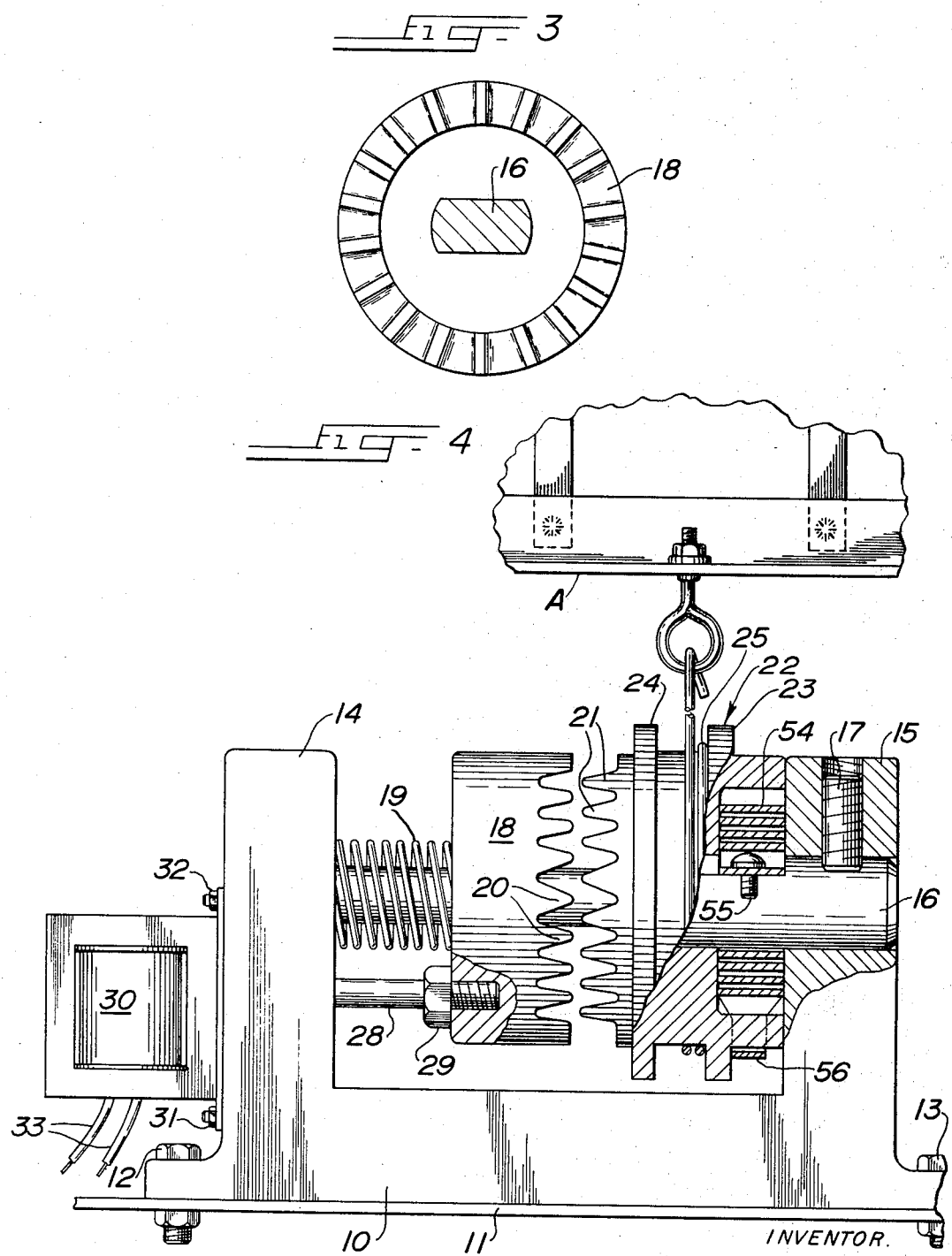

United States Patent Office
3,362,748
Patented Jan. 9, 1968

3,362,748
LOCK-RELEASE SYSTEM FOR VEHICLE
SAFETY BELTS
Andrew G. Carter, 2930 Lake Drive SE.,
Grand Rapids, Mich. 49506
Filed Mar. 28, 1966, Ser. No. 538,064
3 Claims. (Cl. 297—385)

ABSTRACT OF THE DISCLOSURE

The disclosed adjustable vehicle seat and seat belt combination has a normally locked manually controlled positioning mechanism for the seat and a normally locked drum connected to the seat belt. There is a communicating means interrelated between the seat adjusting mechanism and the seat belt drum member whereby release of the normally locked seat mechanism also releases the normally locked seat belt drum.

---

This invention relates to the construction of anchor terminal systems for vehicle safety belts, and the present application is a continuation-in-part of my prior application Ser. No. 300,220, filed Aug. 8, 1963 now Patent No. 3,248,149. Much attention has been given in recent years to the related problems of positioning un-coupled safety belts, and of maintaining the correct slack-free adjustment of the belts and providing for seat adjustment when the belts are in use. One approach to these problems has been through the use of lockable and releasable drums on which the belt material, or a cable connected to the belt, could be secured. These devices are normally mounted on the floor or the frame of the vehicle, and a gentle spring action is usually applied to wind up the belt or cable to apply the desired preliminary belt tension. The belt is usually secured in this condition by locking the drum. A problem arises, however, as to the conditions under which the drum should be released. Similar problems arise where a drum cable is connected to the seat with the belt then being secured to the seat only.

An over-riding consideration in providing for the release of the terminal drum is the so-called "fail-safe" concept. The secured condition of the belt must not depend upon positive manual action to lock the drum, as error or forgetfulness could be fatal. Where the electrical system of the vehicle is involved, failure of the system in a crash must leave the drum fully locked. The release of the belt, in summary, must be as a result of a positive manual action normally not associated with the operation of the vehicle, and release conditions must be terminated immediately upon termination of the intention manual action.

Applicant has found that one of the simplest, safest, and most convenient arrangements for providing for the release of the terminal drum is through interrelating the release mechanism of the drum with the latch device or other positioning system that normally maintains the adjustable seat in the selected position. Most safey belts are associated with the front seat of the vehicle, and it is here that the problems of seat adjustment are most critical. By actuating the seat latch or seat-positioning system to adjust the seat, the terminal drum is auomatically released so that the adjustment of the seat position can proceed without the restraint of the safety belt or seat-securing cable. At the same time, the automatic biasing action of the terminal drum applies the correct belt tension, where the belt is connected to the drum. Upon release of the seat latch handle, or on cessation of action in the seat-positioning system, the terminal drum is automatically restored to the fully locked condition. Extension of the belt, where the belt is connected to the terminal drum is accomplished simply by actuating the seat latch or seat control, whether or not it is also desirable to shift the seat position. It is significant that this arrangement does not require any additional manual control handles for the operator of the vehicle (or a passenger) to get used to, and has the effect of interrelating the locked condition of the safety belt with the vehicle such that the locked condition persists under all normal operating conditions until intercepted by intentional manual action.

The several features of the invention will be discussed in detail through an analysis of the particular embodiment illustrated in the accompanying drawings. In the drawings:

FIGURE 3 is a section on the plane 3—3 of FIGURE 1.

FIGURE 4 is a view similar to FIGURE 1, but illustrating the drum mechanism in the released condition, permitting extension of the safety belt.

Figure 1:
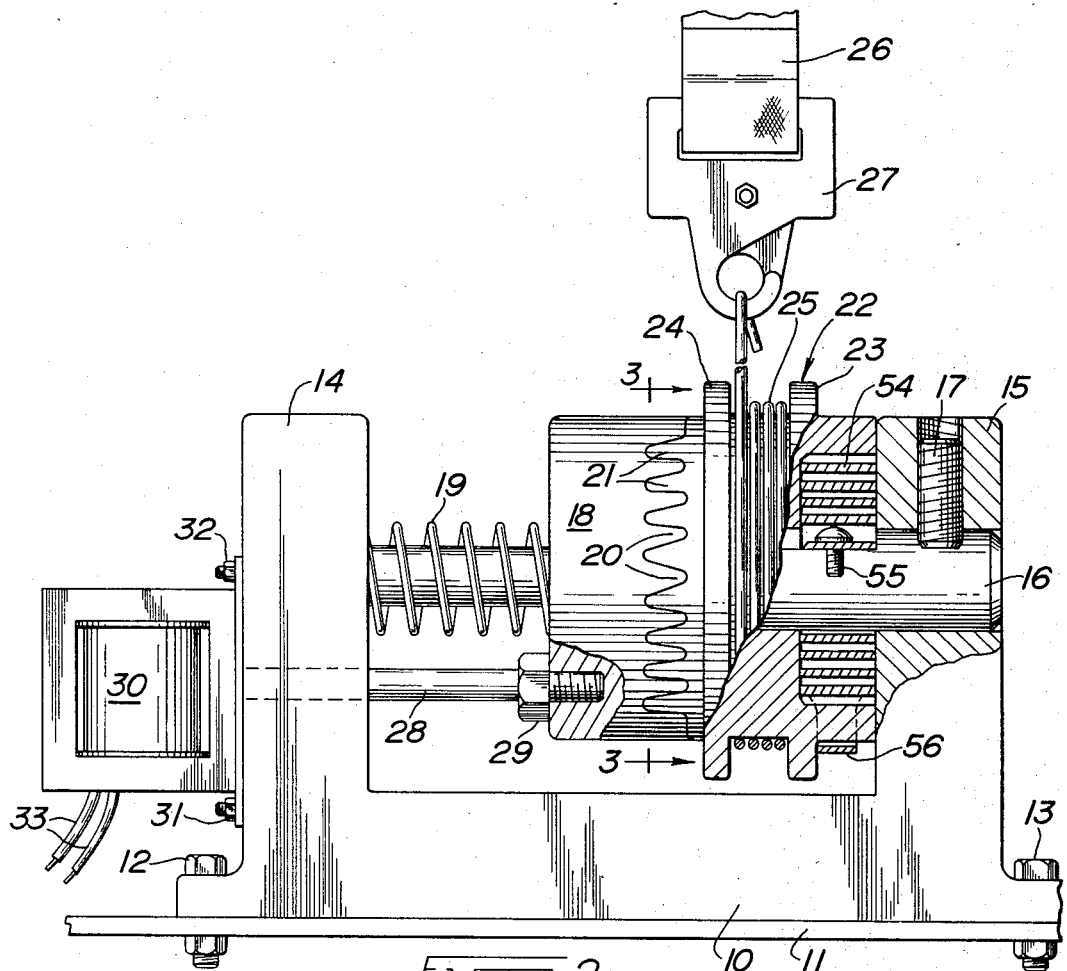
FIGURE 1 is an elevation, partially in section, of a lockable and releasable drum which functions as a safety belt terminal, in the locked condition.

The drum terminal illustrated in FIGURES 1 and 4 includes a sturdy frame 10 normally secured to the floor structure 11 of the vehicle by bolts as shown at 12 and 13. The frame 10 provides the spaced brackets 14 and 15 for non-rotatably supporting the shaft 16. The set screw 17 secures the axial position of the shaft 16 with respect to the frame 10. The portion of the shaft 16 which supports the clutch member 18, and also that which traverses the bracket 14, is flattened on both sides to produce the configuration shown in FIGURE 3. The clutch member, while being slidable on this portion of the shaft 16, is non-rotatable. The spring 19 gently urges the clutch member to the right, as shown in FIGURES 1 and 4, so that the teeth 20 on the clutch 18 will engage with the teeth 21 on the drum 22. This drum is otherwise capable of rotation with respect to the shaft 16, but remains angularly fixed with respect to the shaft as long as the teeth 20 are engaged with the teeth 21. The drum 22 has a peripheral section between the flanges 23 and 24 for receiving the cable 25 connected to the safety belt 26 by the "sister hook" assembly 27, as shown in FIGURE 1, or to the seat frame "A," as shown in FIGURE 4. Alternatively, the cable 25 may be connected directly to the seat frame, with the belt being anchored to the seat structure, as described in my co-pending application Ser. No. 300,220 now Patent No. 3,248,149. The connection of the cable to the sister hooks or to the frame may be through the use of a spliced eye, or through the use of standard cable clamps.

The actuating rod 28 is secured to the clutch member 18 to induce axial movement against the action of the spring 19, and the connection of the rod is preferably by threaded engagement, coupled with the use of the lock nut 29. The actuating rod 28 extends through a suitable hole in the bracket 14, and is freely slidable in this hole. The conventional solenoid 30 is mounted on the outside of the bracket 14 with bolts as shown at 31 and 32, and positions the rod 28. The wires 33 associate the solenoid with the electric system of the automobile, and with the control switch shown in FIGURE 2.

Figure 2:
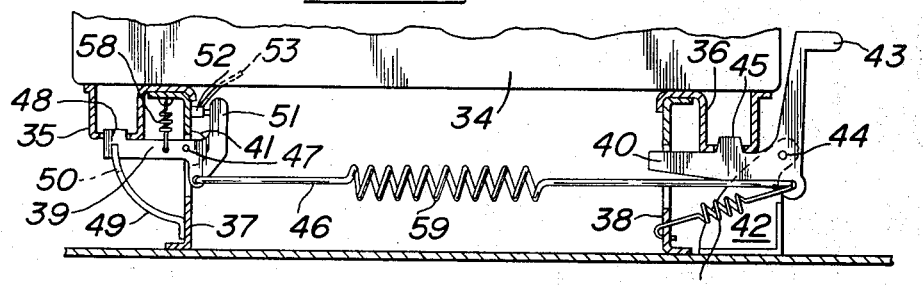
FIGURE 2 is a schematic view showing the interrelationship of the seat-position latch system with the releasable belt terminal.

Referring to FIGURE 2, the seat 34 (normally the front seat of a vehicle) is provided with appropriate rails as shown at 35 and 36, and these are interengaged with the supporting rails 37 and 38 secured to the floor structure of the vehicle. The details of the seat adjustment and mounting may be considered as typical, and form no part of the present invention. The latch members 39 and 40 are pivotally mounted on the support brackets 41 and 42 at the opposite sides of the vehicle, and the handle 43 is conveniently positioned at the side of the driver's seat for convenient manual operation. Slight rotation of the handle 43 about the pivot 44 in a counterclockwise direction will disengage the dog 45 from one of a series of openings at the bottom of the rail 36, and will also pull the actuating rod 46 to the right to induce a similar rotation of the latch member 39 about the pivot 47 to disengage the dog 48. A guide bracket 49, or something equivalent to it, is preferably secured to the base rail 37 to stabilize the position of the latch member 39. The outer extremity of this member moves within a slot 50, which thus relieves the pivot structure from the forces involved in maintaining the position of the seat.

The counterclockwise rotation of the latch member 39 causes the extension 51 to move somewhat to the left, actuating the normally open switch 52. This switch is of a conventional push button type, and the wires 53 leading to the switch are associated with the electrical circuit of the vehicle, and with the wires 33 so that closing of the switch in response to the counterclockwise rotation of the latch member 39 will actuate the solenoid 30, and disengage the clutch 18 to permit free rotation of the drum 22. Where a power-driven seat-psitioning system is used, the switch 52 may be the same switch that controls this system, with the solenoid circuit being preferably in parallel with a positioning actuator. A spiral spring 54 has its inner end secured to the shaft 16 by the screw 55, and the outer end 56 is interengaged with the drum 22 to apply a gentle biasing action tending to wind up the cable 25 to have the effect of shortening the belt 26. The drum 22 is thus placed under the influence of the spring 54 as soon as the solenoid 30 is actuated by the switch 52. The entire system is urged toward the termination of release conditions by the action of the springs 57 and 58, which tend to restore the seat latch mechanism to its fully locked position upon manual release from the handle 43. The spring section 59 in the control link 46 is primarily to eliminate the need for excessively close tolerances in the mechanism on the opposite sides of the seat.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. In a vehicle having an adjustable seat and a normally locked manually controlled positioning mechanism for maintaining the adjusted position of said seat, said vehicle also having a safety belt and a terminal including a releasable and normally locked drum connected to a member secured to said safety belt, the improvement comprising:
    communicating means interrelating said seat positioning mechanism and said terminal whereby actuation of the control of said seat-positioning mechanism also induces release of said terminal drum.
2. The improvement defined in claim 1, wherein said seat positioning mechanism includes at least one locking dog, and said drum is releasable in response to disengagement of said locking dog.
3. The improvement defined in claim 1, wherein said communicating means includes a normally open switch disposed to engage a portion of said seat latch mechanism, and a solenoid electrically connected to said switch and operative to release said drum in response to closure of said switch by said latch mechanism.

References Cited

UNITED STATES PATENTS

| | | | |
|---|---|---|---|
| 2,947,353 | 8/1960 | Wimmersperg | 297—385 |
| 3,077,324 | 2/1963 | Strickland | 297—385 X |
| 3,186,760 | 1/1965 | Lohr et al. | 297—385 X |
| 3,204,916 | 9/1965 | Pickles | 248—429 |
| 3,207,554 | 9/1965 | Dall | 248—429 |

JAMES T. McCALL, *Primary Examiner.*